Feb. 27, 1934. W. KING 1,948,719
METAL SEAL FOR WIRE AND THE LIKE
Filed Aug. 16, 1932 2 Sheets-Sheet 1
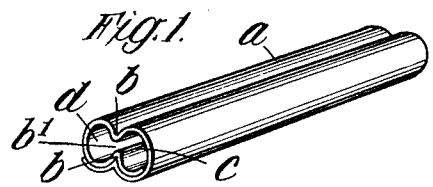
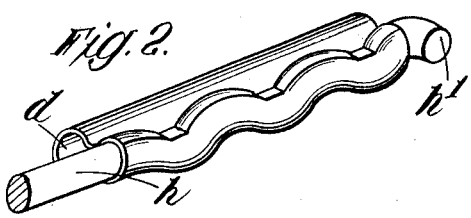
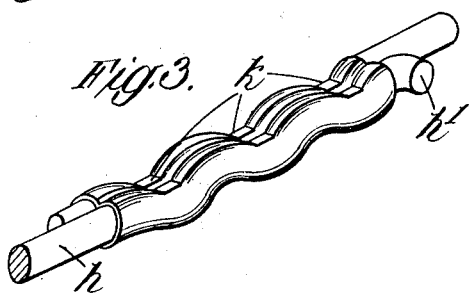
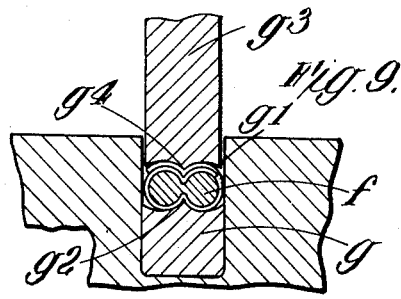
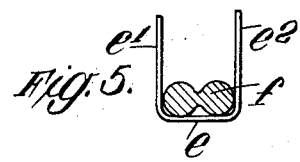
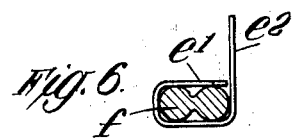
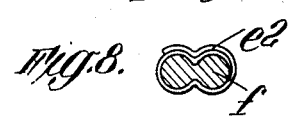
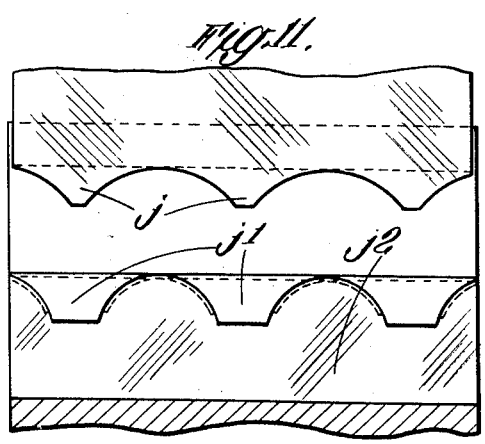
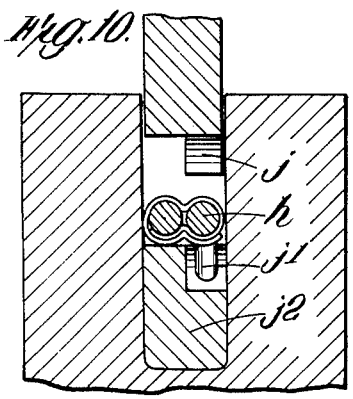
William King
INVENTOR
his Attorney Feb. 27, 1934.  W. KING  1,948,719
METAL SEAL FOR WIRE AND THE LIKE
Filed Aug. 16, 1932  2 Sheets-Sheet 2
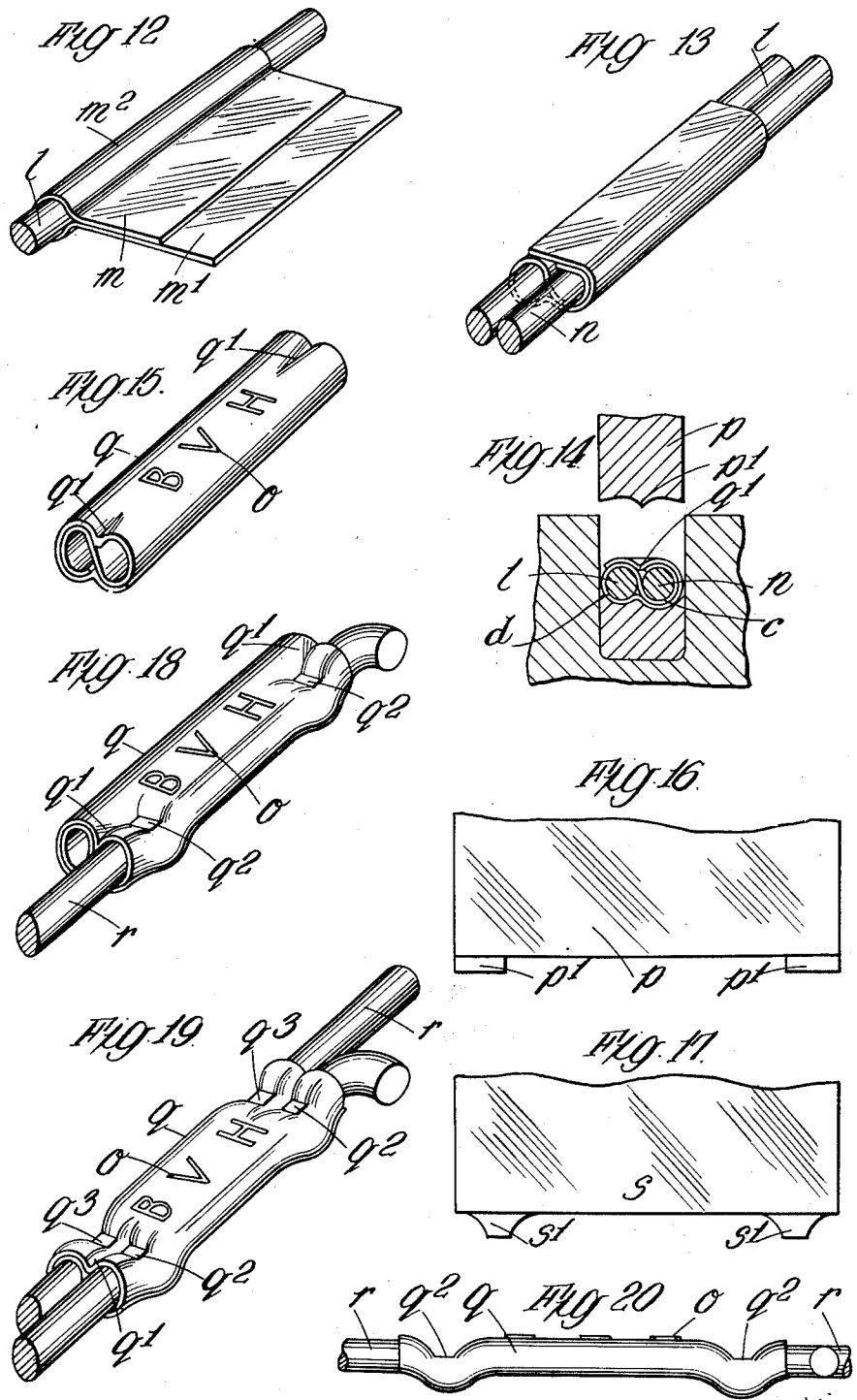
William King
INVENTOR Patented Feb. 27, 1934

1,948,719

UNITED STATES PATENT OFFICE 1,948,719

METAL SEAL FOR WIRE AND THE LIKE

William King, Clapham Park, London, England

Application August 16, 1932, Serial No. 629,024
In Great Britain February 26, 1932

6 Claims. (Cl. 24—23)

This invention relates to improvements in metal seals for wire and the like, and also provides, firstly, an improved method of forming the seal and in securing wire box straps and the like around boxes, cases and the like. The chief objects of the present invention are, firstly, to provide a cheap and very effective seal, and secondly, to provide an improved method of manufacturing said seals.

According to the present invention, the seal comprises a tube like member having oppositely disposed longitudinal internal projections or indentations which substantially divide the internal bore of the tube like member into two parts, each adapted to receive and hold a single wire in such a manner that the wires are separated from one another, the space between the internal longitudinal projections or indentations when the two parts of the bore of the tube like member communicate with one another being insufficient to allow the passage of the wire from one part of the bore to the other. When, however, the seal is formed in a manner hereinafter described, so that the two parts of the bore are separate and distinct, the two wires are kept apart by a separating wall.

The internal longitudinal projections or indentations may be so arranged that one part of the bore is of slightly larger diameter than the other part.

One method of forming the metal seal above defined consists in bending a sheet of metal around a suitable former so that the ends overlap, and then pressing the tube like structure so formed, with or without the former still therein, between dies having longitudinally disposed projections to press the metal of the tube into the bore thereof to form the oppositely disposed longitudinal indentations.

Another method of forming the metal seal according to the present invention consists in bending a strip of metal around a wire so as loosely to enclose the same and then folding the two ends of the strip, which are pressed close together, around a further wire so as to form a double tube-like structure. This seal may then be located in the manner above described to form on the outer surfaces thereof longitudinally disposed projections.

The method of securing the wire box strap or the like according to the present invention consists in permanently attaching to one end of the wire, preferably by corrugating, a metal seal having two non-intercommunicating channels, each adapted to receive a wire and within one of which said end of the wire is located, encircling the box or case with the wire, threading the other end of the wire through the other channel, tensioning the wire and then permanently securing the wire in the other channel, preferably by corrugating the seal and the enclosed wire.

A part of the seal may be left plain to receive a trade mark or any other desired marking.

In order that this invention may be the more clearly understood and readily carried into effect, I will proceed to describe the same with reference to the accompanying drawings, which illustrate by way of example and not of limitation one convenient form of seal according to the present invention, and the preferred method of making the same, and in which Figure 1 is a perspective view of the seal according to the present invention prior to being attached to the wire box strap or the like.

Figure 2 is a perspective view showing the same attached to the end of the box strap or the like, and Figure 3 is a perspective view of the sealed part of the box strap or the like after it has been secured about the box or case.

Figure 4 is a plan view of the sheet of metal from which the seal is formed according to the preferred method, and Figures 5, 6, 7 and 8 show in end elevation the various stages of manufacture of the seal.

Figures 9, 10 and 11 are views showing diagrammatically the tools used to shape the seal and also permanently attach the same to one end of the wire box strap or the like.

Figures 12 and 13 show in perspective the method of forming a further seal according to the present invention, and Figure 14 is a view similar to Figure 9 showing the tool used to provide the seal with the longitudinally and oppositely disposed indentations on its outer surface.

Figure 15 is a perspective view of a seal according to the present invention arranged to bear a trade mark or other indication of the maker or the contents of the box about which the wire strap is arranged.

Figure 16 is an elevation of the lower part of the tool for forming the longitudinally disposed indentations in the seal shown in Figure 15.

Figure 17 is an elevation of the lower part of the tool for attaching the seal shown in Figure 15 to one end of the wire.

Figure 18 is a perspective view of the seal shown in Figure 15 attached to one end of the wire.

Figure 19 is a perspective view of the finished seal in position, and

Figure 20 is a side elevation of the same.

Referring now more particularly to Figures 1 to 11 of the accompanying drawings, the seal $a$ according to the present invention is somewhat of oval form (see Figure 1) but is provided with inwardly projecting longitudinal ridges or indentations $b$ which are oppositely disposed and thus partly separate the bore into two parts or channels $c$ and $d$ without, however, the ridges $b$ meeting one another. This seal may be formed in any suitable manner, for example, it may be formed from lengths of metal tubing drawn or extruded to the required cross-section, or it may be formed from an oval tube, suitably treated, as hereinafter explained, or it may be formed from sheet metal. I prefer to form the seal from sheet metal, as I have found that this is a cheap and very satisfactory form both as regards the construction of the seal and the manipulation thereof.

Figures 4 to 8 show the manner in which the seal may be formed from sheet metal. $e$ (Figure 4) is the sheet of metal, as shown in Figures 5 to 7, or may comprise two lengths of wire laid side by side. The former $f$ is laid on the sheet of metal $e$ centrally, and the ends $e^1$ and $e^2$ are bent up round the former, as shown in Figure 5, by a suitable tool. The next operation (Figure 6) consists in bending down one of the ends ($e^1$), this end being of such a length that its edge just touches, or is just clear of, the other end $e^2$. After the end $e^1$ has been bent down on to the former, the end $e^2$ is then bent down on to the other part $e^1$ so as to give the shape shown in Figure 7. The seal is thus formed into a tube-like structure which is somewhat of oval shape. It now remains to provide the seal so formed with the oppositely disposed longitudinal ridges or indentations $b$. This is effected by means of a press, the material parts of which are illustrated diagrammatically in Figure 9. The press comprises an anvil $g$ having a recess $g^1$ of suitable width to receive the seal shown in Figure 6, the base of this recess being provided with an upstanding central rib $g^2$. The die member $g^3$ is a sliding fit in the recess $g^1$ and also on its underside is provided with a central ridge forming projection $g^4$. Thus, when the seal is treated in the press shown in Figure 9, the two internal longitudinally disposed ridges or indentations $b$ will be formed. The former $f$ is, it will be seen, suitably shaped to allow these ridges $b$ to be formed, and the die parts may also be fashioned to carry out any shaping of the seal that may be necessary. Figure 8 shows the seal after treatment in the press shown in Figure 9, and it will be seen that, after the former $f$ is withdrawn, the seal will be of the form shown in Figure 1.

The seal, it will be appreciated, is in the form of two channels $c$ and $d$, side by side, the channels not being, however, separated from one another by a wall, but communicating with each other along the space $b^1$ between the inwardly projecting ridges $b$. This space $b^1$ between the ridges is of such size as to prevent a wire placed in one side from slipping into the other side.

The ridges extend inwardly sufficiently far to prevent the two wires when located in the channels $c$ and $d$ touching one another.

The seal, according to the present invention, is principally intended to be permanently fixed to one end of a length of wire $h$ which is, of course, of the required length to surround the package with which it is to be used. Any suitable means may be employed for fixing the seal $a$ to the end of the wire $h$, thus, for example, one end of the wire may be turned down, as at $h^1$ (Figure 2), to prevent the seal slipping off. I prefer, however, to corrugate the seal and the wire therein, as shown in Figure 2, to hold the seal $a$ on the wire $h$, or to corrugate the seal and also turn down wire. This corrugation is carried out by means of a suitable tool, Figures 10 and 11, having corrugating projections $j$ adapted to take into corresponding depressions $j^1$ in the anvil block $j^2$ extending only half way across the tube. The corrugation effected by this tool, therefore, extends only across one half of the seal, i. e. across that half containing the wire, and for this purpose the presence of the inwardly projecting ridges and the fact that the wire does not extend into the other channel will be of considerable utility, since it will prevent all deformation of the other half of the seal during the corrugating process.

I have found that unless the seal be so shaped that the wires when in position do not touch, it is not possible adequately to corrugate the one half of the seal and the wire therein without affecting the other half of the seal and thus making it difficult, if not impossible, to thread the wire into the other channel. Thus separation of the two wires will also facilitate the cutting off of any spare wire without damaging the other wire in the seal.

That part $d$ of the seal which is adapted to receive the free end of the wire when it has been passed around the package is preferably of slightly larger diameter than the wire so that the wire is an easy sliding fit therein. That part $c$ of the seal $a$ which is adapted to be permanently fixed to one end of the wire is, however, preferably a close fit on the wire.

The free end of the wire may be held in the seal in any suitable manner, preferably by means of corrugating the seal on that half which was previously not corrugated, as at $k$ (Figure 3), and if these corrugations $k$ are adapted to register with the corrugations previously made in the other half of the seal, as shown in Figure 3, the force necessary for finally sealing or uniting the two ends of the wire will be reduced.

Figure 3 shows in perspective the seal after it has been so corrugated.

Any suitable machine may be used to corrugate the seal, preferably, however, a machine such as is described in my co-pending patent application Serial No. 629,023 filed August 16, 1932, since this will enable the work to be carried out with only a small expenditure of force as each corrugation is made separately.

Figures 12 to 14 show a further method of producing a seal according to the present invention. In this method a strip of material similar to $e$ (Figure 4) but slightly larger for the same size of seal is taken and is bent loosely around a wire $l$. The two ends $m$ and $m^1$ of the metal strip $m^2$ are pressed flat together, the upper part $m$ being shorter than the lower part $m^1$. The two ends $m$ and $m^1$ are then bent around another wire $n$ (Figure 13) so that the seal after the wires $l$ and $n$ have been withdrawn comprises the two separated channels $c$ and $d$ (see Figure 14). The seal shown in Figure 13 is then pressed in a tool shown in Figure 14 which is the same as that shown in Figure 9 to cause the seal to assume the same external shape as that previously described.

The seal is used in the manner above described and it will be seen that the seal differs in effect from the seal shown in Figure 1 merely by reason of the fact that the two channels c and d are definitely separated from one another.

A further very useful and novel feature of the seal according to the present invention is that it may be arranged to bear a trade mark o (Figure 15) which may be stamped thereon or otherwise applied thereto. When the seal as shown in Figure 15 is to be produced, I may make the seal according to either of the methods described and illustrated above, but in place of the die $g^3$, shown in Figure 9, I employ the die shown in Figure 16. Here the die $p$ is provided only with two spaced ridges $p^1$, so that when it is used in place of the die $g^3$ it merely forms longitudinally disposed indentations $q^1$ in the upper surface of the seal $q$ (Figure 15) the centre part of the seal $q$ being left plain to receive the indication $o$. The same die member $g$ is used as in Figure 9 so that the longitudinally disposed indentation extends along the whole length of the seal at the bottom. Similarly, in attaching this seal to one end of the wire $r$ (Figure 18), I use the tool $s$ (Figure 17) instead of the tool $j$ (Figure 10). This tool $s$ is provided with two corrugating projections $s^1$ spaced similarly to the projections $p^1$ on the die $p$. Thus the seal and the enclosed wire will be corrugated only at the ends as at $q^2$ (Figure 18) and the middle part of the seal carrying the trade-mark or like indication $o$ will be left plain.

In the same way, when the seal is finally secured in position, it is only corrugated at its ends as at $q^3$ and the whole middle portion is left plain, (see Figures 19 and 20).

I claim:—

1. A metal seal for mechanically connecting together the ends of a wire box strap or the like, comprising a tube like member, the upper and lower surfaces thereof being provided with oppositely disposed longitudinal internal projections which substantially divide the internal bore of the tube into two parts, each adapted to receive a single wire, the space between the internal longitudinal projections being insufficient to allow the passage of the wire from one part of the bore to the other.

2. A metal seal for mechanically connecting together the ends of a wire box strap or the like, comprising a tube like member having two parallel bores each thereof being adapted to receive a wire, said tube like structures consisting of a single bent piece of metal, and the two bores being separated by a single thickness of said metal, and the upper and lower surfaces of the tube-like members being provided with oppositely disposed longitudinal indentations located between the bores.

3. A metal seal for mechanically connecting together the ends of a wire box strap or the like, as claimed in claim 1, in which one of said bores has a slightly larger diameter than the other, substantially as described.

4. A wire box strap or the like comprising a length of wire and a metal seal of tube-like form, the upper and lower surfaces of said seal being provided with oppositely disposed longitudinal internal indentations which substantially divide the internal bore of the tube into two parts, the end of said wire being located in one of said bores, the seal being permanently attached to the wire by transverse corrugations formed in the enclosed part of the wire and in that part of the seal within which said wire is located, the other part of said seal being unaffected by the corrugation of the seal so that it is free to receive the other end of the wire.

5. A wire box strap or the like comprising a length of wire and a metal seal, comprising a tube-like member having two parallel bores, the end of said wire being located in one of said bores, said tube-like structures consisting of a single bent piece of metal, and the two bores being separated by a single thickness of metal, and the upper and lower surfaces of the tube-like member being provided with oppositely disposed longitudinal indentations located between the bores, said seal being permanently attached to the wire by transverse corrugations formed in the enclosed part of the wire and in that part of the seal within which said wire is located, the other part of said sealing being unaffected by the corrugation of the seal so that it is free to receive the other end of the wire.

6. A wire box strap or the like comprising a length of wire and a metal seal of tube-like form, the upper and lower surfaces of the latter being provided with spaced longitudinal indentations which substantially divide the internal bore of the tube into two parts, in one of which the end of said wire is located, indicia on the surface separating the spaced longitudinal indentations, the seal being permanently attached to the wire by transverse corrugations formed in the enclosed part of the wire and in that part of the seal outside the surface between the spaced longitudinal indentations, the other part of said seal being unaffected by the corrugation of the seal so that it is free to receive the other end of the wire.

WILLIAM KING.